(12) United States Patent
Vatish et al.

(10) Patent No.: US 12,527,558 B2
(45) Date of Patent: Jan. 20, 2026

(54) NEEDLE AND USES THEREOF

(71) Applicant: Oxford University Innovation Limited, Oxford (GB)

(72) Inventors: Manu Vatish, Oxford (GB); Radu Cimpeanu, Oxford (GB); Ektoras Georgiou, Oxford (GB); Alfonso Arturo Castrejon-Pita, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 972 days.

(21) Appl. No.: 17/762,865

(22) PCT Filed: Sep. 24, 2020

(86) PCT No.: PCT/GB2020/052316
§ 371 (c)(1),
(2) Date: Mar. 23, 2022

(87) PCT Pub. No.: WO2021/058961
PCT Pub. Date: Apr. 1, 2021

(65) Prior Publication Data
US 2022/0323112 A1    Oct. 13, 2022

(30) Foreign Application Priority Data

Sep. 25, 2019 (GB) ...................................... 1913801
Apr. 1, 2020 (GB) ...................................... 2004834

(51) Int. Cl.
*A61B 17/435* (2006.01)
*A61B 10/02* (2006.01)
*A61M 1/00* (2006.01)

(52) U.S. Cl.
CPC ........ *A61B 10/0283* (2013.01); *A61B 17/435* (2013.01); *A61M 1/84* (2021.05); *A61B 2217/005* (2013.01)

(58) Field of Classification Search
CPC ............ A61B 10/00; A61B 2010/0074; A61B 10/0291; A61B 10/02; A61B 10/06; A61B 17/435; A61B 2217/005; A61B 2217/007; A61B 17/425; A61B 10/0283; A61M 1/84
See application file for complete search history.

(56) References Cited

U.S. PATENT DOCUMENTS 4,700,694 A * 10/1987 Shishido .............. A61B 17/435
                                                                600/164
2021/0212728 A1* 7/2021 Greening ............... A61B 17/43

* cited by examiner

*Primary Examiner* — Deanna K Hall
(74) *Attorney, Agent, or Firm* — Thomas|Horstemeyer, LLP

(57) ABSTRACT

A needle for extraction of biological material from a fluid filled intracorporeal sac, the needle comprising: a shaft comprising a first flow channel comprising an inlet for aspirating biological material from the intracorporeal sac and a second flow channel comprising an outlet for supplying a flushing fluid to the intracorporeal sac; and wherein the outlet is configured to direct the flushing fluid in a direction substantially transverse to the first flow channel; and methods using the needle.

21 Claims, 17 Drawing Sheets

NEEDLE AND USES THEREOF

CROSS-REFERENCE TO RELATED APPLICATIONS

This application is the National Stage of International Application No. PCT/GB2020/052316, filed Sep. 24, 2020, which claims priority to GB 1913801.5, filed Sep. 25, 2019 and GB 2004834.4, filed Apr. 1, 2020, which are entirely incorporated herein by reference.

The present invention relates to the field of medical needles and particularly, but not exclusively, to needles for the extraction of biological matter, aspiration devices and methods of extracting biological material from intracorporeal sacs.

In-vitro fertilisation is an important area of reproductive medicine. The procedures involved include multiple stages, requiring several visits to a health professional in order for them to be carried out. One of these stages is the retrieval of oocytes (eggs) from the female partner or donor.

Oocyte retrieval is an invasive and expensive procedure, with current apparatus and techniques resulting in an approximate retrieval rate of 60% based on computer modelling. Research has demonstrated that the more oocytes that can be retrieved, the greater the chances of success in achieving a baby.

It is an aim of the present invention to at least ameliorate one or more of the problems associated with the prior art. In particular, it is an aim of the present invention to improve oocyte retrieval rates.

According to an aspect of the invention there is provided a needle for extraction of biological material from a fluid filled intracorporeal sac. The needle comprises a shaft comprising: a first flow channel comprising an inlet for aspirating biological material from the intracorporeal sac; and a second flow channel comprising an outlet for supplying a flushing fluid to the intracorporeal sac, wherein the outlet is configured to direct the flushing fluid in a direction substantially transverse to the first flow channel.

Having the outlet configured to direct the flushing fluid in a direction substantially transverse to the first flow channel promotes a flow within the intracorporeal sac, when the needle is inserted into an intracorporeal sac, that affects more of the volume therein than if the outlet was configured to direct the flushing fluid in a direction substantially parallel to the first flow channel.

The outlet may be configured to direct the flushing fluid in a direction that is between orthogonal to and opposite to the first flow channel. In other words the flow is directed between 90° and 180° to the first flow channel. Preferably the outlet is configured to direct the flushing fluid in a direction that is between 120° and 150°. Further preferably the outlet is configured to direct the flushing fluid at about 135° to the first flow channel.

The outlet may be configured such that, when inserted into an intracorporeal sac, the flushing fluid creates a flow within the fluid in the intracorporeal sac that promotes improved displacement and movement of biological matter contained within the intracorporeal sac towards the inlet in comparison to needles of the prior art. The intracorporeal sac may be a follicle, and the biological material may comprise an oocyte.

The outlet may be configured such that when the needle is located in an intracorporeal sac, and the flushing fluid is supplied to the intracorporeal sac, vortical structures associated with beneficial flow in terms of inducing biological matter movement and eventual extraction are created in the intracorporeal sac.

The creation of vortical structures within the intracorporeal sac better ensure the fluid flow reaches more of the volume within the sac through the propagation of vortical flow. By vortical flow it is meant a flow containing vortical structures. Various flow patterns may be created by the introduction of the flushing fluid into the intracorporeal sac, the flow patterns are determined at least in part by the configuration of the outlet. Each of these flow patterns may provide a flow which incorporates more of the volume of the intracorporeal sac and to a greater extent than the flow patterns generated by needles of the prior art. The created flow paths may be longer than those created by the use of the needles of the prior art. The flow paths may be directed towards a peripheral region of the intracorporeal sac. The flow paths created may contact more of the volume of the intracorporeal sac. The flow paths may result in an increased probability of picking up biological matter residing in regions previously unreached by the flow paths created by flushing fluid supplied by needles of the prior art. The biological matter may then be more likely to be picked up and successfully transported to the inlet for aspiration.

The inlet and outlet are arranged with respect to each other so as to facilitate aspiration and flushing. The inlet and outlet may be located at or proximal to a distal end of the needle. The inlet may be at a distal end of the needle. The outlet may be at or proximal to the distal end of the needle. The outlet may be within 10 mm of the inlet. The outlet may be within 7 mm of the inlet. The outlet may be more than 0.5 mm of the inlet. The outlet may be between 1 and 2 mm of the inlet. Positioning the outlet at or proximal to the distal end of the needle ensures that the outlet will be situated within the intracorporeal sac when the needle is inserted. Increasing the distance between the inlet and the outlet increases the length of the pathway of the flow within the intracorporeal sac, and will thereby affect a larger portion of its volume. The design of the needle may balance the requirements of ensuring that the outlet is positioned within the intracorporeal sac upon insertion; increasing the displacement between the inlet and outlet; and aiding insertion of the needle.

The first flow channel may comprise an inner flow channel and the second flow channel may comprise an outer flow channel. The outer flow channel may surround the inner flow channel. The inner flow channel and outer flow channel may be circular, or substantially circular in cross section. The outer flow channel may surround all or just a part of the inner flow channel. The inner and outer flow channels may be concentric or, alternatively, non-concentric.

The inner and outer flow channel configuration allows the needle to be used with aspiration devices on the market with minimal or no modification, as the proximal end of the needle will be similar to, or the same as, the proximal ends of known aspiration needles.

The needle may comprise one or more first flow channels and one or more second flow channels. In one embodiment the first flow channel comprises a circular inner flow channel which is surrounded completely by a second flow channel which forms the outer flow channel. Alternatively, one or both of the first and second flow channels may comprise a plurality of flow channels. For example, the second flow channel may comprise a plurality of outer flow channels which may be circumferentially spaced around the inner flow channel.

The needle may further comprise a tip, at the distal end, for inserting the needle into an intracorporeal sac. In an embodiment the inner flow channel may protrude beyond the outer flow channel at the tip of the needle.

The tip of the needle may comprise a flange surrounding the outlet. The flange may be at or near the distal end of the needle. The flange may be positioned on a wall of the inner flow channel. The flange may be annular. The flange may be shaped like an arrowhead. The flange may be frustoconical or frustopyramidal.

An internal angle between the flange and the wall of the inner flow channel may be less than 90°, this angle may in the context of this application be considered substantially transverse to the first flow channel. The internal angle between the flange and the wall of the inner flow channel may be between 5° and 75°. The internal angle between the flange and the wall of the inner flow channel may be between 30° and 60°. Preferably, the angle between the flange and the wall of the inner flow channel may be 45°. Providing a flange having an acute angle defining the relationship between the outlet and the inlet allows for greater control of the flow path of the flushing fluid within the intracorporeal sac.

The flange may comprise a baffle for directing flushing fluid in a direction substantially transverse to an axis of the first fluid channel.

The flange may be of unitary construction with the wall of the inner flow channel. The flange may be a separate part bonded to the wall of the inner flow channel.

The outlet may be formed in a wall of the outer flow channel. The outer flow channel may be capped at its distal end. The outlet may comprise a plurality of outlets. The plurality of outlets may be arranged circumferentially around the wall of the outer flow channel. The outlet may be formed from one or more holes or perforations provided in the outer wall of the outer flow channel. The holes may be formed perpendicularly to the wall or formed at an angle such that flushing fluid is directed away from the inlet. The holes may be angled between 30° and 60° relative to the wall. Preferably the holes are angled at about 45° relative to the wall. In other words the flushing fluid is directed at approximately 45° to an average flow direction in the first flow channel and approximately 135° to an average flow direction in the second flow channel.

According to a further aspect of the invention there is provided an aspiration device comprising the needle of the invention, a suctions means and a collection means.

The suction means may comprise a vacuum pump. The suction means may further comprise a vacuum regulator.

The collections means may comprise a collection canister. Having a collection means, and particularly a collection canister, incorporated into the device allows for easier retrieval and storage of the contents of the aspirated intracorporeal sac. The collection means may be removable from the device. Having a removable collection means provides a transport means for the aspirated contents, without having to transfer them to a separate device, which would thereby increase the risk of damage or contamination.

The aspiration device may further comprise a gauge. The gauge allows a user to ensure that a correct level of vacuum is being maintained and for what duration so as to monitor the procedure.

According to a further aspect of the invention there is provided a method of extracting an oocyte from a follicle using the needle or aspiration device of the invention.

The method may comprise inserting the needle into a follicle located within the ovary, supplying a flushing fluid into the follicle through the second flow channel, and aspirating the oocyte from the follicle through the first flow channel.

According to a further aspect of the invention there is provided a method of extracting biological material from an intracorporeal sac. The method may comprise inserting a needle of the invention in the intracorporeal sac, supplying a flushing fluid into the intracorporeal sac through the second flow channel, and aspirating the biological material from the intracorporeal sac through the first flow channel.

The flushing fluid may be introduced transverse to an aspiration direction. Introducing the flushing fluid transversely to the direction of aspiration may increase the flow path length when compared to flow path lengths created in methods of the prior art. Introducing the flushing fluid transversely to the direction of aspiration may also or instead induce vortical flow. Increasing the flow path length and/or inducing vortical flow may in turn increase the likelihood of the biological matter being successfully aspirated from more regions within the intracorporeal sac compared to methods of the prior art.

The intracorporeal sac may be an ovarian follicle which may comprise an oocyte.

The intracorporeal sac may be an abscess or a cyst, the biological material may be pus or other biological fluid.

The needle may be configured for use in in vitro fertilisation and in particular in oocyte harvesting for use in in vitro fertilisation.

BRIEF DESCRIPTION OF THE DRAWINGS

Embodiments of the invention will now be described, by way of example only, with reference to the accompanying drawings, in which:

FIG. 1b shows a plan, semi-transparent view of a side of the known needle of FIG. 1a;

FIG. 6b shows a plan view of a side of the needle tip of FIG. 6a;

FIG. 7b shows a cross sectional view of the needle tip of FIG. 7a.

Figure 1A:
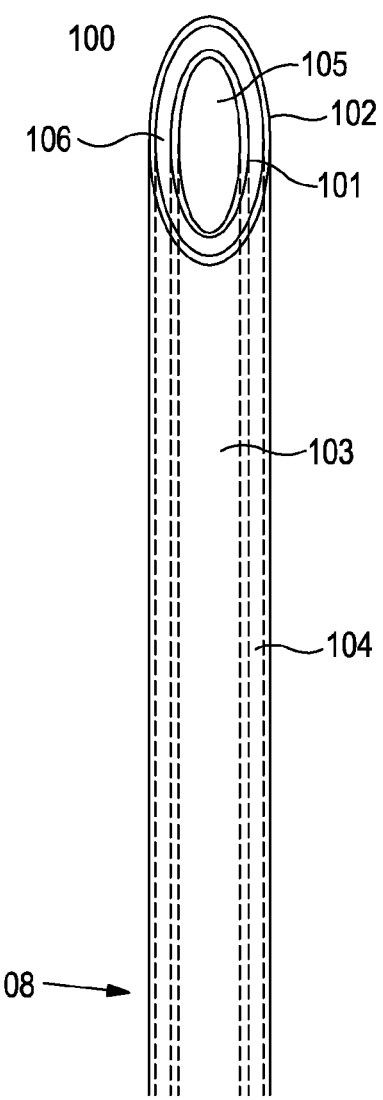
FIG. 1a shows a plan, semi-transparent view of a front of a needle tip known in the art.
Figure 1B:
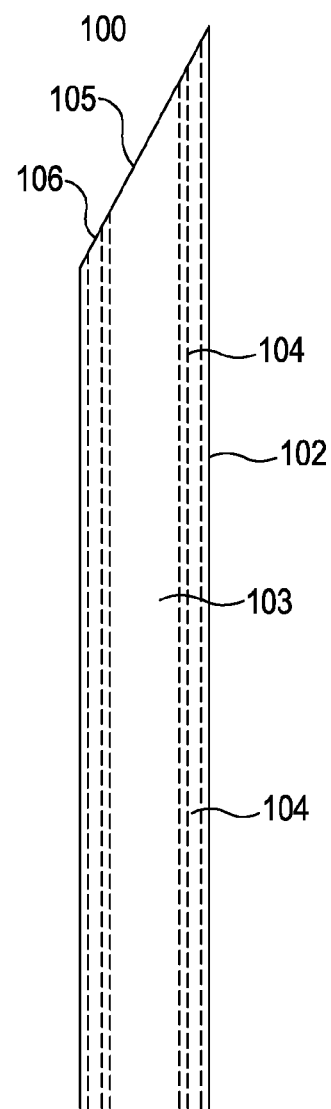

A combined flushing and aspiration needle 100 known from the art is shown in FIGS. 1a and 1b. The needle comprises a shaft 108. The shaft comprises a pair of concentric flow channels: a first or inner flow channel 103 and a second or outer flow channel 104. The inner and outer flow channels are each defined by a respective wall 101, 102.

The inner flow channel 103 is of conventional construction as used for other aspiration needles known in the art, in that it is formed as a central bore defined by a wall 101. The inner flow channel 103 forms an aspiration flow channel 103. The outer flow channel 104 is arranged to encompass the inner flow channel 103. A radial offset of the wall 101 of the inner flow channel with respect to the wall 102 of the outer flow channel forms an annular void 104 therebetween. The annular void defines the outer flow channel 104, which forms a flushing flow channel 104, for the introduction of a flushing fluid. The flushing fluid is a fluid, such as isotonic water or cell medium. The inner flow channel 103 terminates at its distal end with an opening that forms an inlet 105. The outer flow channel 104 terminates at its distal end with an opening that forms an outlet 106.

In use, the needle 100 is inserted into an ovarian follicle. The follicle contains a single oocyte, the location of which is most likely unknown. A dual action flushing and aspiration methodology may then be performed. The contents of the ovarian follicle may first be aspirated, via the inlet 105, into the inner flow channel 103. The aspiration may be performed to the point of near collapse of the follicle. The flushing fluid may then be introduced into the follicle, via the outlet 106, out of the outer flow channel 104. The follicle may return approximately to its original size during this flushing action. Aspiration via the inner flow channel 103 may then be performed again.

Other aspiration and flushing strategies may be implemented, for example flushing and aspirating in parallel, overlapping the steps, or commencing flushing before the start of aspiration.

The needle discussed below has been designed such that the end user of the needle can carry out the process of extraction of oocytes without having to alter their usual procedure when using the needles of the prior art as described above.

The presently described needle differs in that it provides means for ensuring that flow within the follicle can better circulate. This is done by providing a flushing flow transverse to the aspiration flow.

Figure 2:
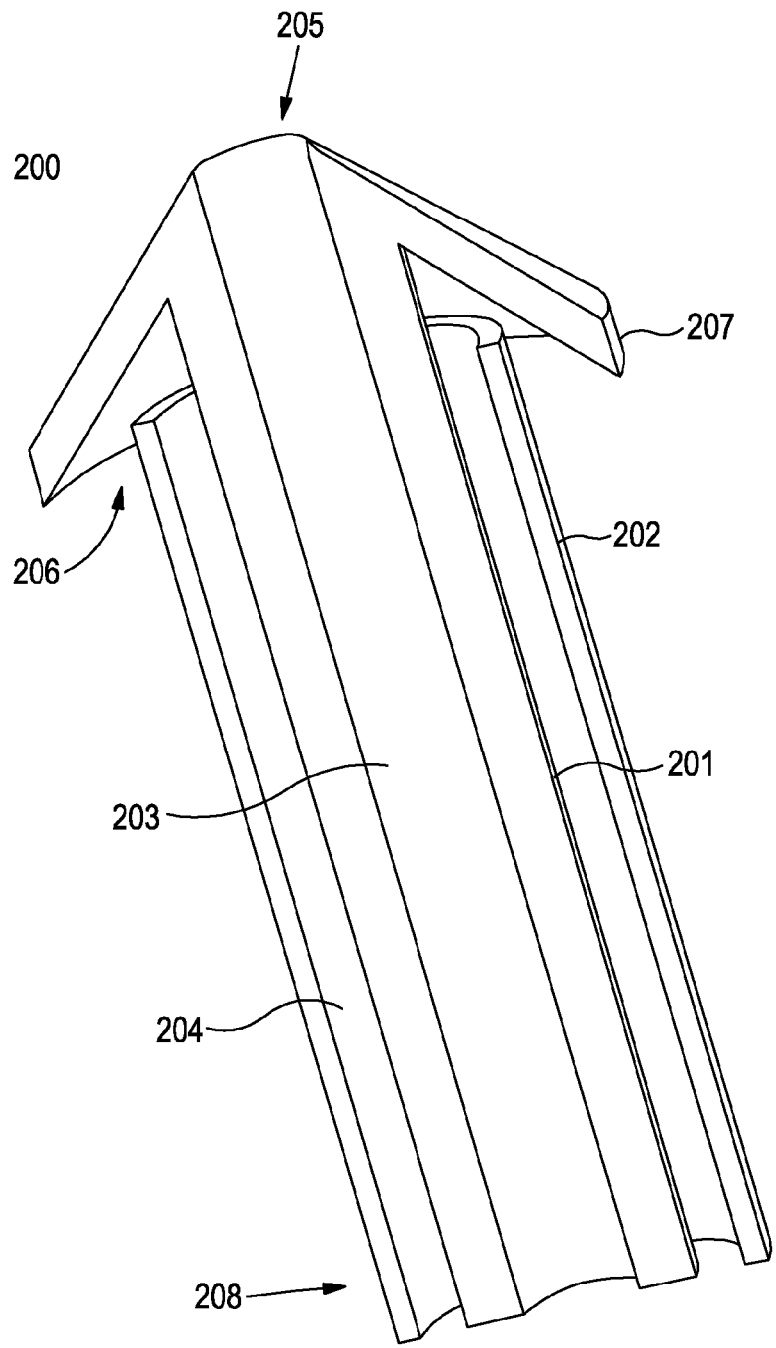
FIG. 2 shows a cross sectional, isometric drawing of a needle tip according to an embodiment of the invention.

FIG. 2 shows a cross section of a distal end of a first example of a needle 200 according to the invention. The majority of the length, i.e. the shaft 208, of the needle remains unchanged from the multichannel needles known in the art and hence only details associated with a distal end, or tip, of the needle 200 are shown. As with the multichannel needle 100 of the prior art the needle 200 comprises a first flow channel 203 and a second flow channel 204. The first flow channel 203 is an inner flow channel 203 and is of conventional construction for other aspiration needles known in the art, in that it has a central bore defined by a wall 201. The second flow channel 204 is an outer flow channel 204 and is arranged to encompass the first flow channel 203. A radial offset of a wall 201 of the inner channel 203 to a wall 202 of the outer channel 204 forms an annular void therebetween. The annular void defines the outer flow channel 204, which forms a flushing flow channel 204, for the introduction of a flushing fluid. The flushing fluid is a fluid, such as isotonic water or cell medium.

The needle 200 comprises an inlet 205 and an outlet 206. The inlet 205 is formed in the inner flow channel 203 at a distal end of the needle, providing an inlet for aspirating biological material into the first flow channel 203. The outlet 206 is formed proximal to the distal end of the needle and provides an outlet for introducing flushing fluid into an intracorporeal sac from the second flow channel 204. The outlet 206 is formed such that it is orientated to deliver the flushing fluid in a direction transverse to the inlet 205.

The outlet 206 is formed through an interaction between the wall 201 of the inner flow channel 203 and the wall 202 of the outer flow channel 204. The inner flow channel 203 extends further distally than the outer flow channel 204 such that the distal end of the inner flow channel 203 is more distal than the distal end of the outer flow channel 204. Proximal to the distal end of the inner flow channel 203 is a flange 207 disposed on the wall 201 of the inner flow channel 203. The flange 207 is annular and radially extends from the wall 201 of the inner flow channel 203.

The flange 207 has a radial dimension sufficient for it to extend radially at least as far as a circumference of the wall 202 of the outer flow channel 204. The flange 207 has a linear dimension by which it extends away from the distal end of the needle 200. By linear dimension it is meant a dimension that is parallel to an axis of the shaft 208 of the needle 200. The combination of the linear dimension and the radial dimension provides the flange 207 with a frustoconical form, wherein the smaller circumference of the frustum is proximal to or at the distal end of the needle and the larger circumference of the frustum is less proximal to the distal end of the needle compared to the smaller circumference. In other words the frustoconical form begins proximal to the tip of the needle and broadens as it extends about the length of the needle. The flange 207 extends beyond the circumference of the wall 202 of the outer flow channel 204 such that the outer flow channel 204 terminates within an open volume formed by the flange. The outlet 206 is therefore formed between the larger circumference of the flange 207 and the distal end of the wall 202 of the outer flow channel 204. This interaction extends the outer flow channel 204 beyond the wall 202 of the outer flow channel 204 into the void and to the outlet 206.

The radial extent of the flange 207 may be modified in dependence on design requirements and further experimentation. The examples of the flange shown in the figures are examples only. The flange may have a smaller radial extent, such that it may not even extend as far as the wall 202 of the outer flow channel. The flange may instead have a greater radial extent. The function of the flange 207 is to direct flushing flow transverse to aspirational flow. In some examples the radial extent of the flange is minimised whilst still providing a transverse flow.

An angle formed between the flange 207 and the wall 201 of the inner flow channel 204 is less than 90°. More specifically the angle is between 5° and 75°. Preferably the angle is between 30° and 60°, and, more specifically the angle is approximately 45°.

The configuration of the outlet 206 serves to direct the flushing flow in a direction away from the inlet 205, in a direction substantially transverse to the flow of the aspirated fluid. It also separates the inlet 205 and outlet 206 spatially, thereby providing a longer flow path within the intracorporeal sac and reducing the chance that the flushing fluid is aspirated without it having circulated throughout the intracorporeal sac, as discussed further below. The design also promotes access to any target biological matter that may be situated proximal to an insertion point of the needle into the intracorporeal sac, which would not have resulted in successful retrieval using prior art designs.

The flange 207 may be of unitary construction with the wall 201 of the inner flow channel 203. The flange 207 may therefore be formed from the material of the wall 201 of the inner flow channel 203 itself. Forming the flange may comprise using a combination of mandrels and turning on the tip of the inner flow channel 203 to reflexively mould and/or bend the flange 207 out of the wall 201 of the inner flow channel 203. A bevel, such as those provided on needles known in the art, may then be added to the tip post fabrication. Alternatively, the flange 207 may be formed as a separate component and joined to the wall 201 of the inner flow channel 203. Joining may be in the form of laser welding or any other suitable technique. The techniques may be combined, for example, a lip may first be formed using a mandrel and turning and the flange 207 then attached to said lip.

The flow channels 203, 204 of the needle 200 may be manufactured separately and then assembled together, the inner flow channel 203 being inserted into the outer flow channel 204.

The rest of the manufacture and materials used in the fabrication of the needle align with those known in the art (the materials predominantly comprising medical grade stainless steel) and, as such, will not be discussed further.

Figure 3:
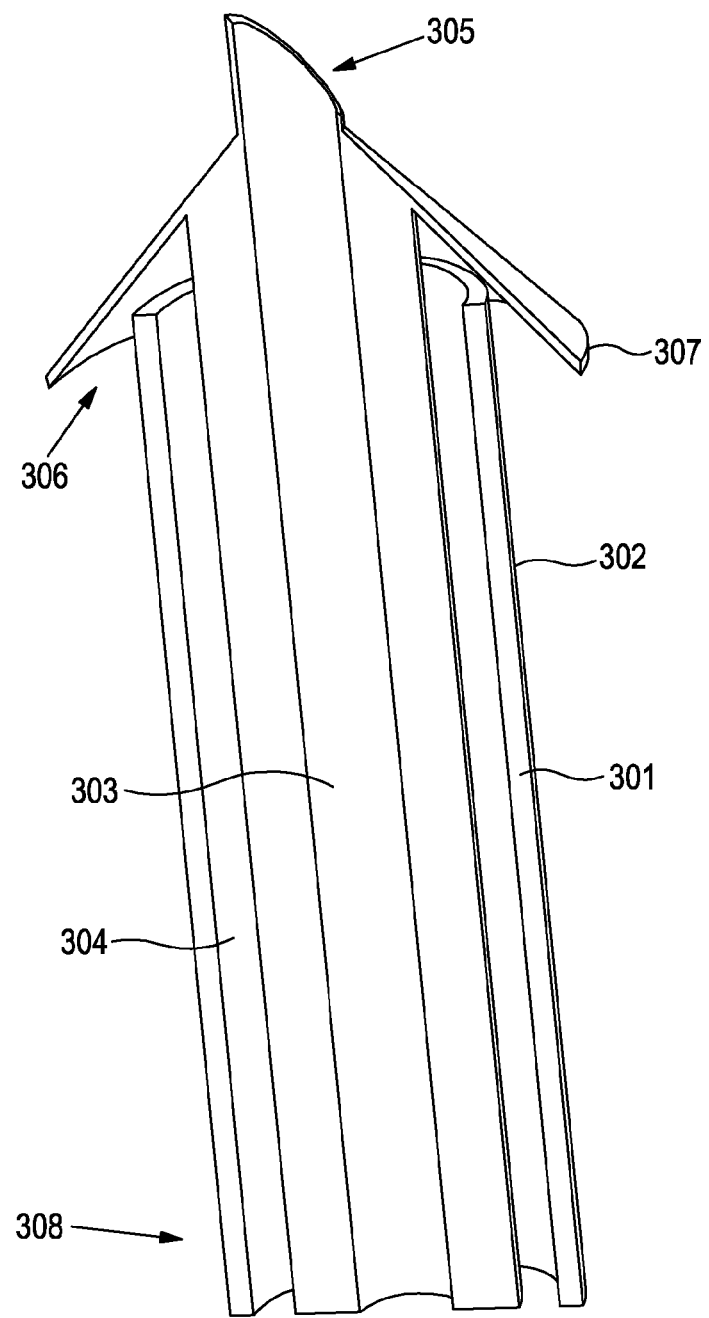
FIG. 3 shows a cross sectional, isometric drawing of a needle tip according to a further embodiment of the invention.

A second example of a needle 300 according to the invention is shown in FIG. 3. This needle 300 is of substantially similar construction to the previous example, having an inner flow channel 303, and an outer flow channel 304 with respective walls 301, 302. The outlet 306 is also similarly arranged to the outlet 206 of the needle 200 of the previous example.

In this example, the inner flow channel 303 extends distally beyond the flange 307 and provides a tip that is of equivalent construction to needle tips known in the art. This provides a tip with improved penetration capabilities as it allows for further sharpening and bevelling of the tip when compared to the needle 200 of the previous example.

Various modifications may be made to the flange 207 of either of the above examples. For example, the flange 207 need not have a linear dimension and may instead have a disc form. Alternatively the flange may have a linear dimension, but extending towards the distal end of the needle, i.e. the frustum is orientated in an opposite direction along an axis of the shaft 208 of the needle 200.

In other examples the outlet 206 may be orientated up to 180° from the inlet 205, 305. In this way flushing flow and aspiration flow are configured to be substantially parallel, such that flow from the outlet 206, 306 is directed towards a wall of the follicle proximal to the insertion point of the needle. This configuration may be provided with a flange 207 that has a wall that is parallel or near parallel to the wall 202 of the outer flow channel 204 such that the outer flow channel is arranged to 'double back' upon itself. The flange may therefore be elbowed to have a first wall portion transverse to the wall 201 of the inner flow channel 203 and a second wall portion parallel or near parallel to the wall 202 of the outer flow channel 204.

Figure 6A:
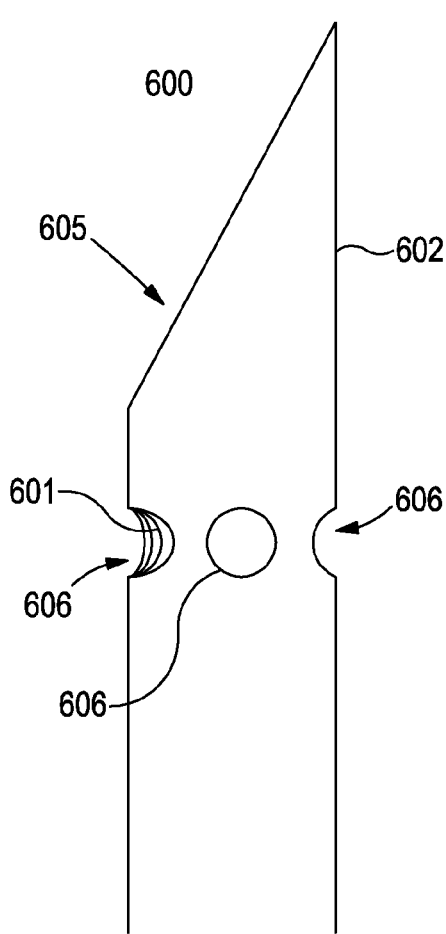
FIG. 6a shows a plan view of a front of a needle tip according to a further embodiment of the invention.
Figure 6B:
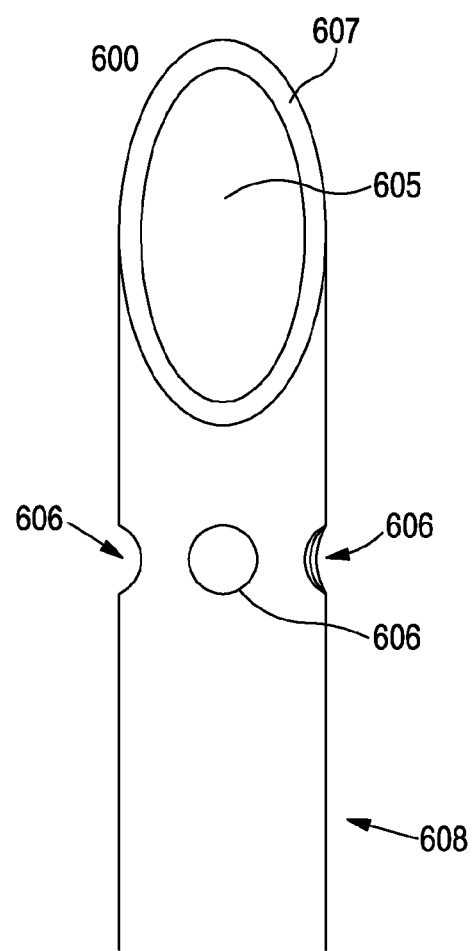

In other examples the inlet 205 and outlet 206, and similarly the first flow channel and outer flow channel may be reversed. In other words, the inner flow channel may be the flushing flow channel and the outer flow channel may be the aspiration flow channel. Other constructions are envisaged which would fulfil a similar function to the above examples, improved over the prior art. Such an example is shown in FIGS. 6a and 6b, in which a modification has been made to the needle of the prior art 100 to provide a closing 607 in order to 'cap' the outer flow channel at its distal end, thereby closing the original outlet. The shaft 608 of the needle 600 is again of comparable construction to the previous examples and needles known in the art. This may be done through welding an outlet such as the outlet 106 seen in the needle 100 known in the art closed or the provision of an annular cap. A new outlet is formed through making perforations or holes 606 in the wall 602 of the outer flow channel 604. These holes may be made prior to assembling the outer flow channel 604 around the inner flow channel 603 in order to ensure that only the outer flow channel 602 is perforated, maintaining the original inlet 605.

Figure 7A:
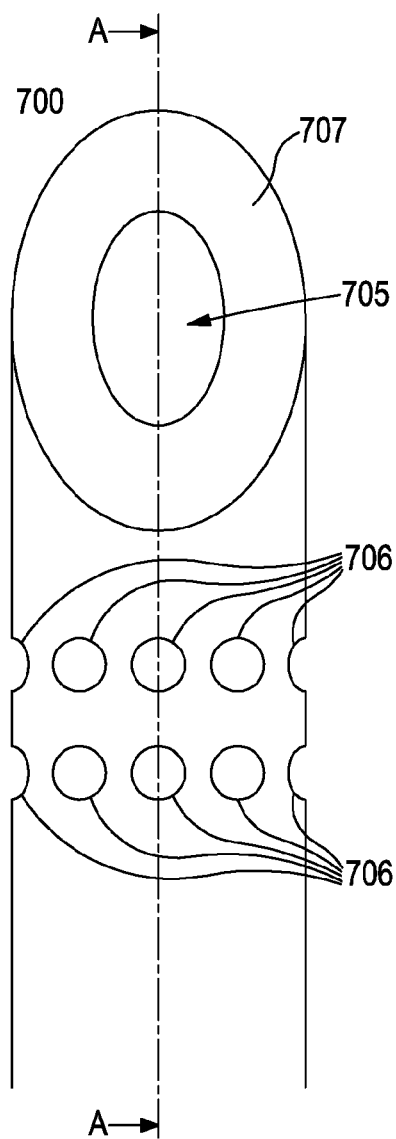
FIG. 7a shows a plan view of a front of a needle tip according to a further embodiment of the invention.
Figure 7B:
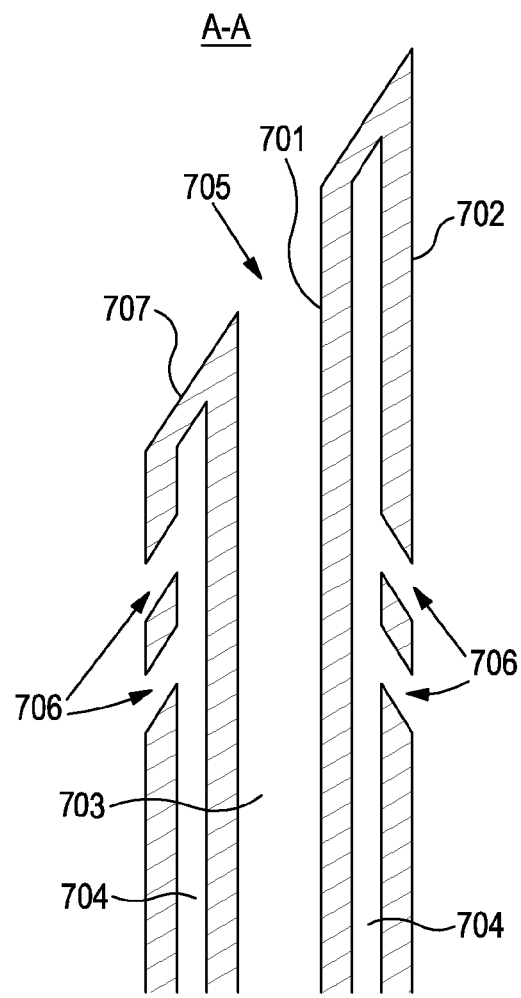

Another example is shown in FIGS. 7a and 7b, in which FIG. 7b provide a cross section through plane A-A' of FIG. 7a. As in the example of FIGS. 6a and 6b a closing 707 has been provided in order to 'cap' the outer flow channel 704 at its distal end, thereby closing the original outlet. A new outlet is formed through the making perforations or holes in the outer wall 602, these holes are formed at a non-perpendicular angle to the axis of the needle. This provides, as in the examples having a flange, an outlet that directs a flushing flow away from the inlet. The holes are angled at approximately 45°. Any suitable angle less than 90° may be used. The acuteness of the angle permitted may be limited by the material the needle is formed from and the manufacturing technique selected. Angles of between 30° and 60° are preferable.

FIGS. 6a and 6b provide a single row of apertures to form the outlet. In other examples more rows may be provided. FIGS. 7a and 7b provide two rows of apertures to form the outlet, in another example only one row may be provided, or more than two rows may be provided. Each row may comprise at least one aperture and preferably two or more apertures equally spaced along the circumference of the outer wall. In some examples the apertures between rows may be offset from each other circumferentially, as opposed to the example of FIGS. 7a and 7b in which the apertures are aligned. Various aperture patterns may be incorporated which may be adapted to design constraints to provide a particular flushing flow direction, a particular flow velocity or flow volume.

The holes may be formed by any suitable drilling method. Due to the small size and tolerances involved a precision drilling tool is preferred. In this example a laser drilling and ablation system is used to form the holes.

These, and many other, alternatives are envisaged to fall within the scope of the appended claims. The features and structures of any of the preceding examples may be combined in any combination or omitted.

FIGS. 4a to 4f show a selection of plots for a respective simulation of an oocyte retrieval process for the needle 100 of the prior art. Each figure shows a first plot (i), which plots a pathway of an oocyte within a follicle, as well as the relevant needle structures and initial contour of the flexible intracorporeal sac, a second plot (ii), which shows displacement of the oocyte from an exit of the follicle (i.e. the inlet) over time, and a third plot (iii), which shows a maximum velocity of an oocyte over time. Each simulation differs in the starting position of the oocyte, all other variables are kept constant.

Figure 4A:
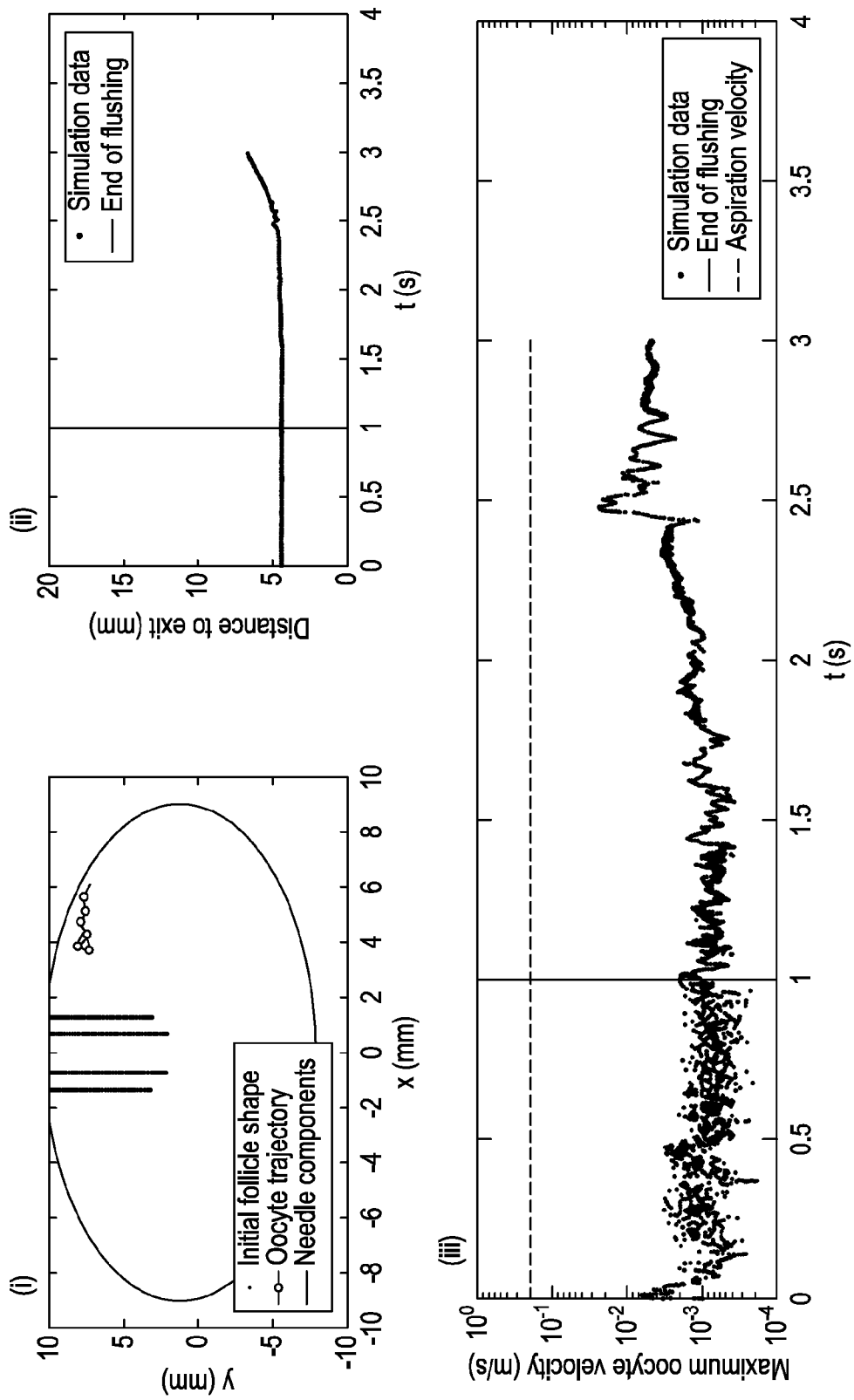
FIGS. 4a-4f show a selection of plots modelling extraction of an oocyte using a needle of the prior art.
Figure 4B:
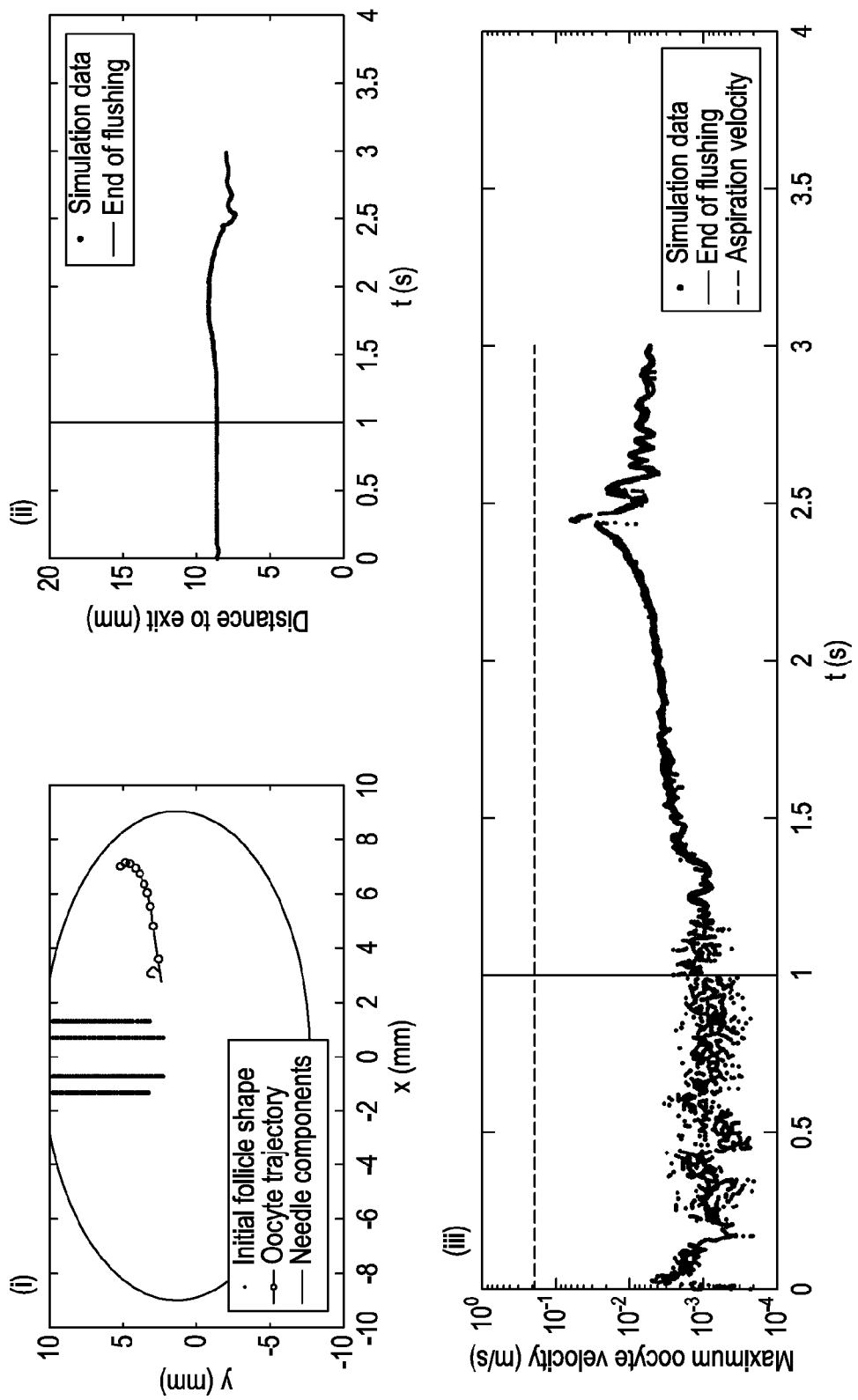
Figure 4C:
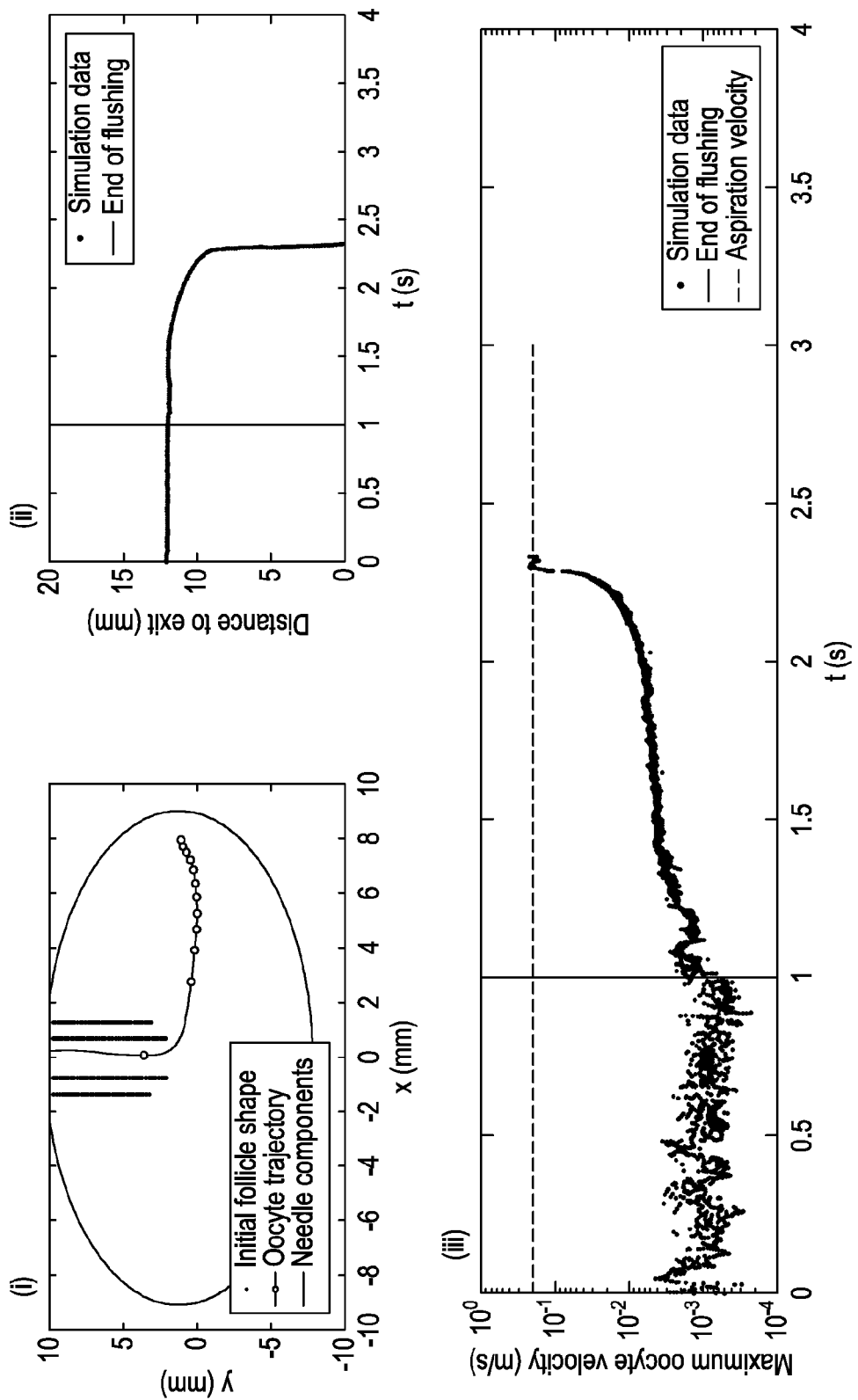
Figure 4D:
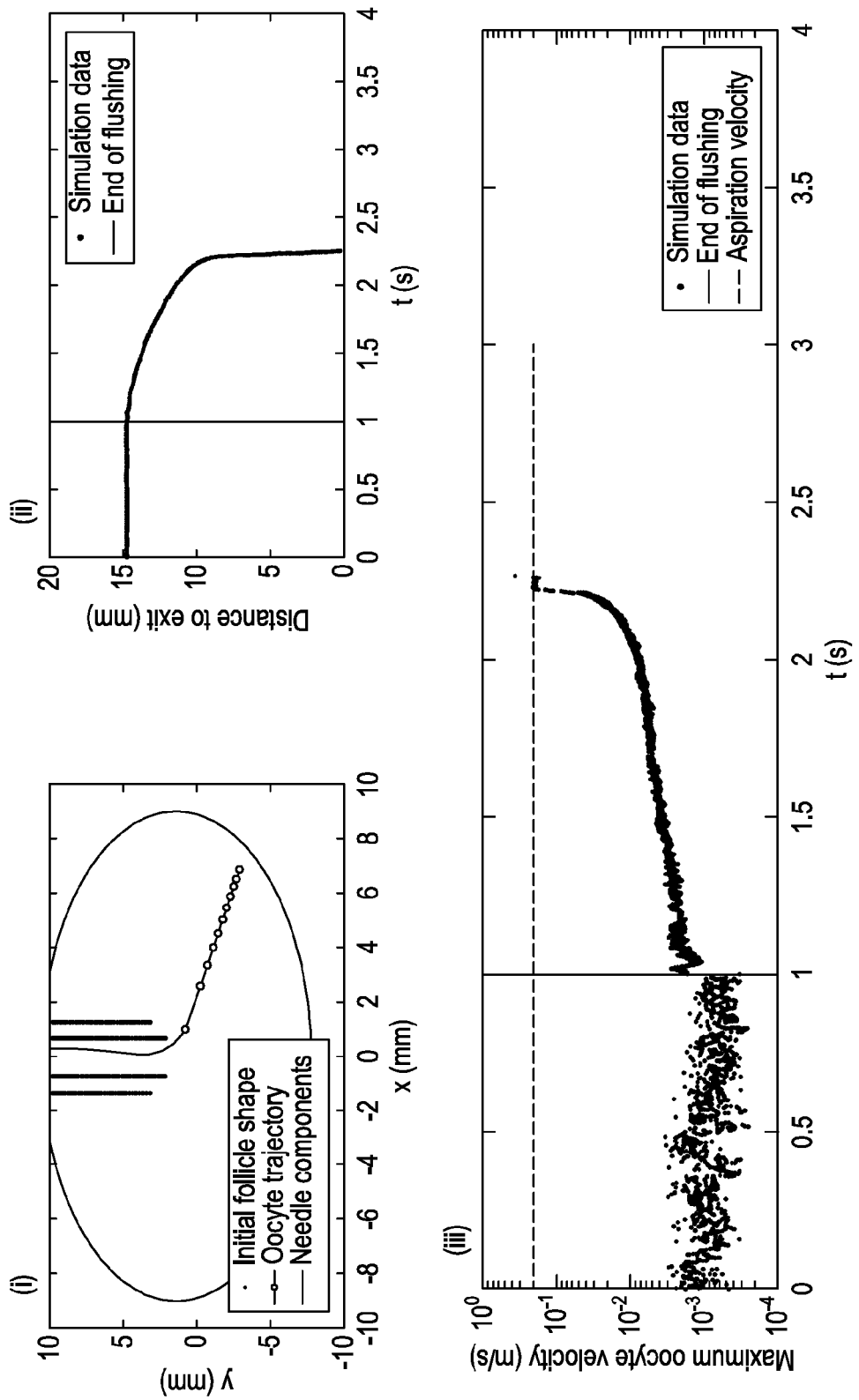
Figure 4E:
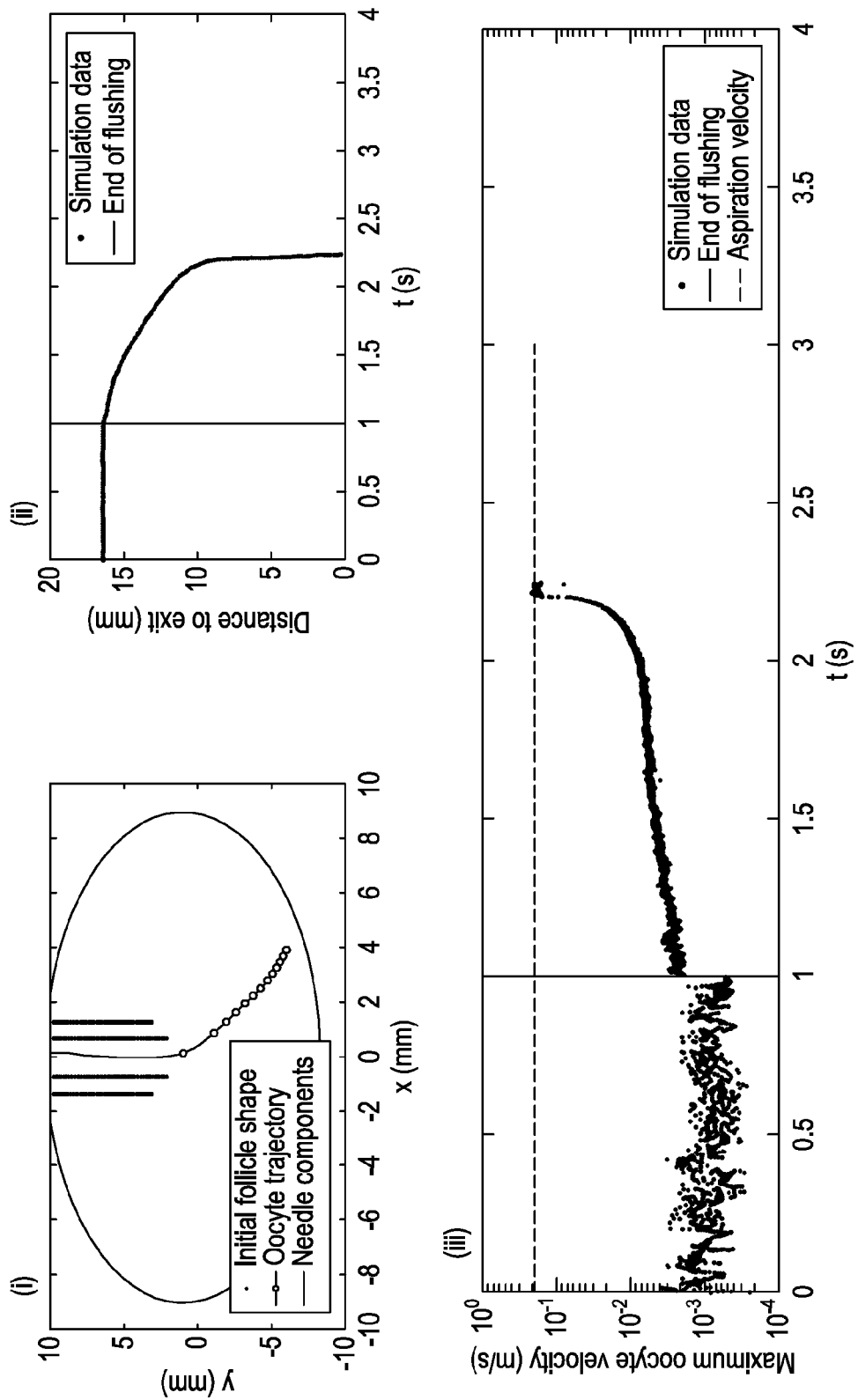
Figure 4F:
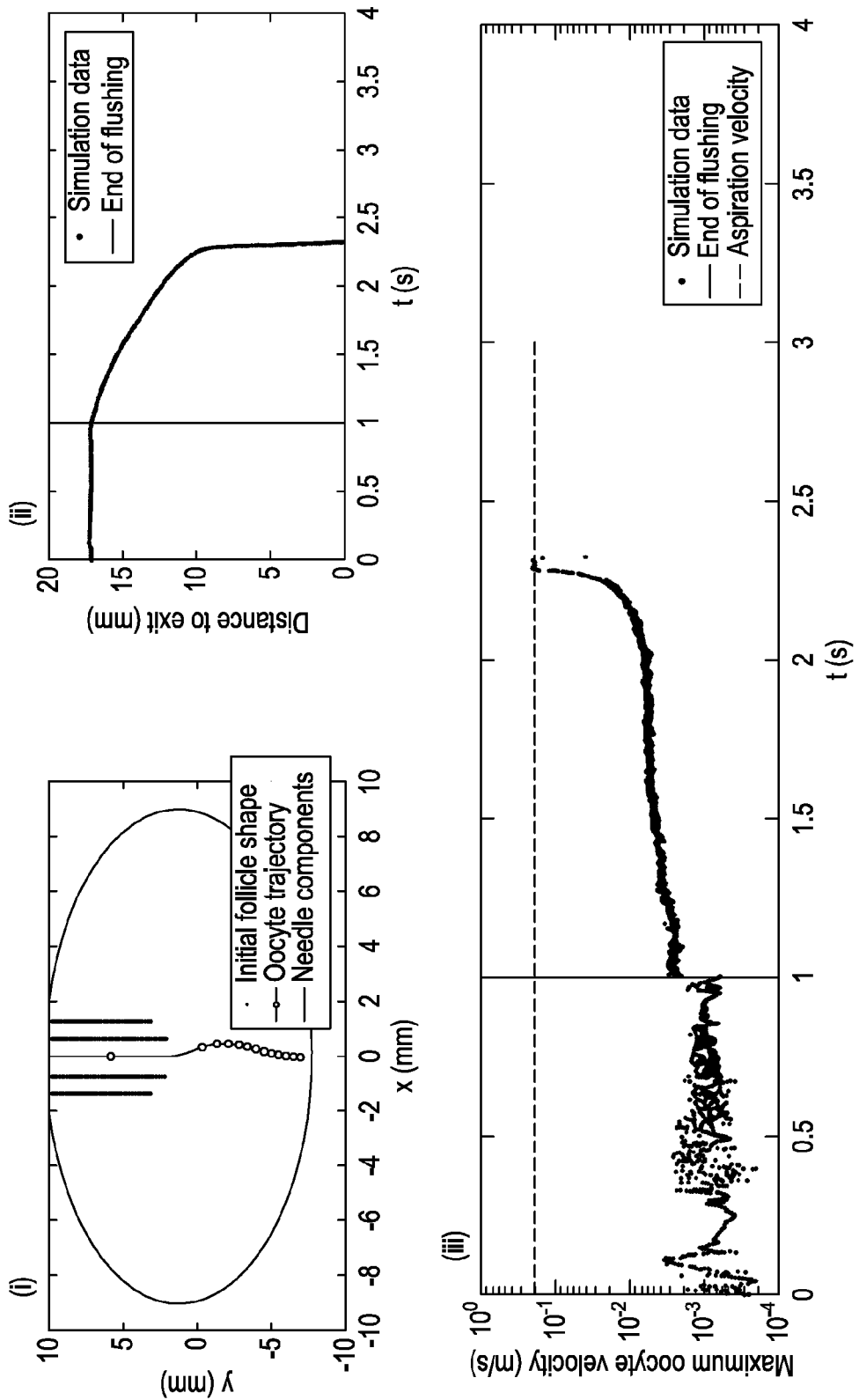

It can be seen from the plots of FIGS. 4a and 4b that not all of the flushing and aspiration sequences are successful. In these simulations the oocyte is situated adjacent to an insertion point of the needle into the follicle. As the flushing fluid is introduced into the follicle via the outlet 106 a flow within the follicle is promoted. Aspiration of the contents of the follicle via the inlet 105 occurs prior to the commencement of flushing in order to aspirate as much of the content of the follicle as possible. The follicle is then filled by the flushing media and then re-aspirated in order to try and improve the chances of successfully aspirating the oocyte from the follicle. As none of the flushing flow is directed towards the sides of the needle the oocyte is not caught in any substantial part of the flow. Once the flushing and aspiration sequence is completed the needle is removed and the follicle is ruptured. The oocyte is not recovered, and is no longer recoverable, at this point. Other aspiration and flushing steps are envisaged.

FIGS. 5a to 5f show a selection of plots for simulations of a flushing and aspiration sequence for the new needle 200. The figures correspond to FIGS. 4a to 4f, with the same respective simulations but for the new needle 200 as opposed to the needle 100 of the prior art. It can be seen from the plots of all of FIGS. 5a to 5f that all of the flushing and aspiration sequences are successful for the new needle 200.

Figure 5A:
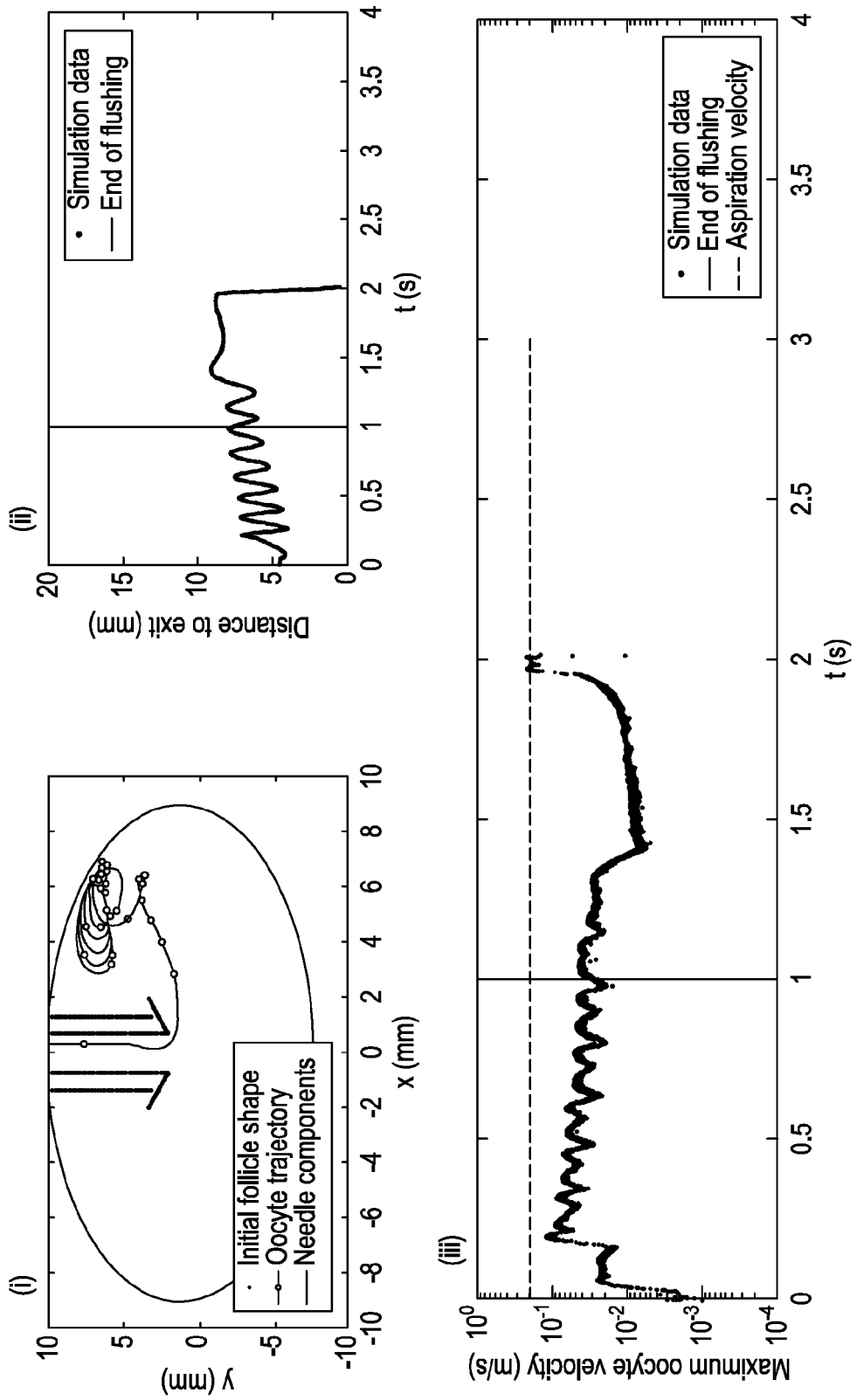
FIGS. 5a-5f show a selection of plots modelling extraction of an oocyte using a needle according to an embodiment of the invention.
Figure 5B:
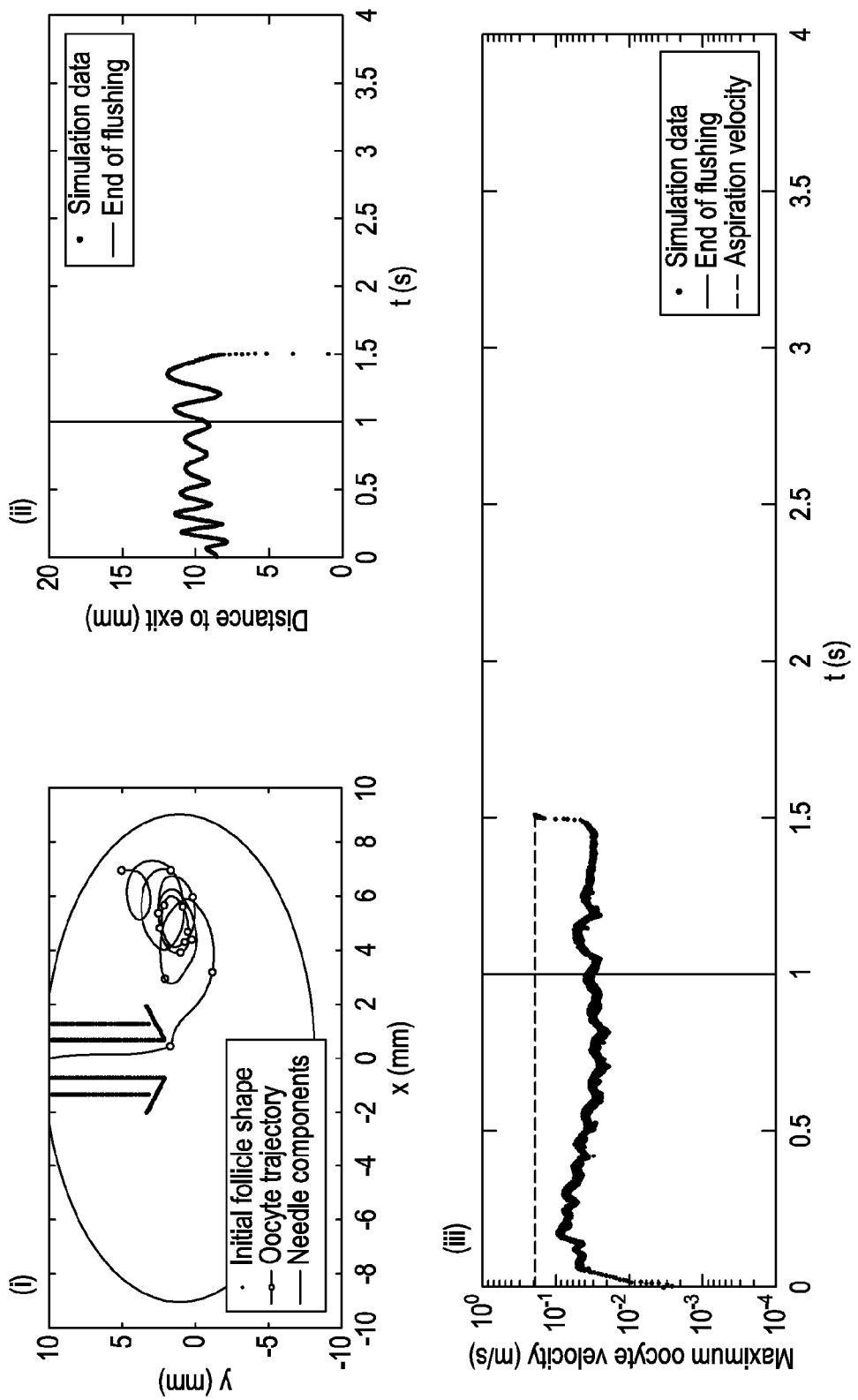
Figure 5C:
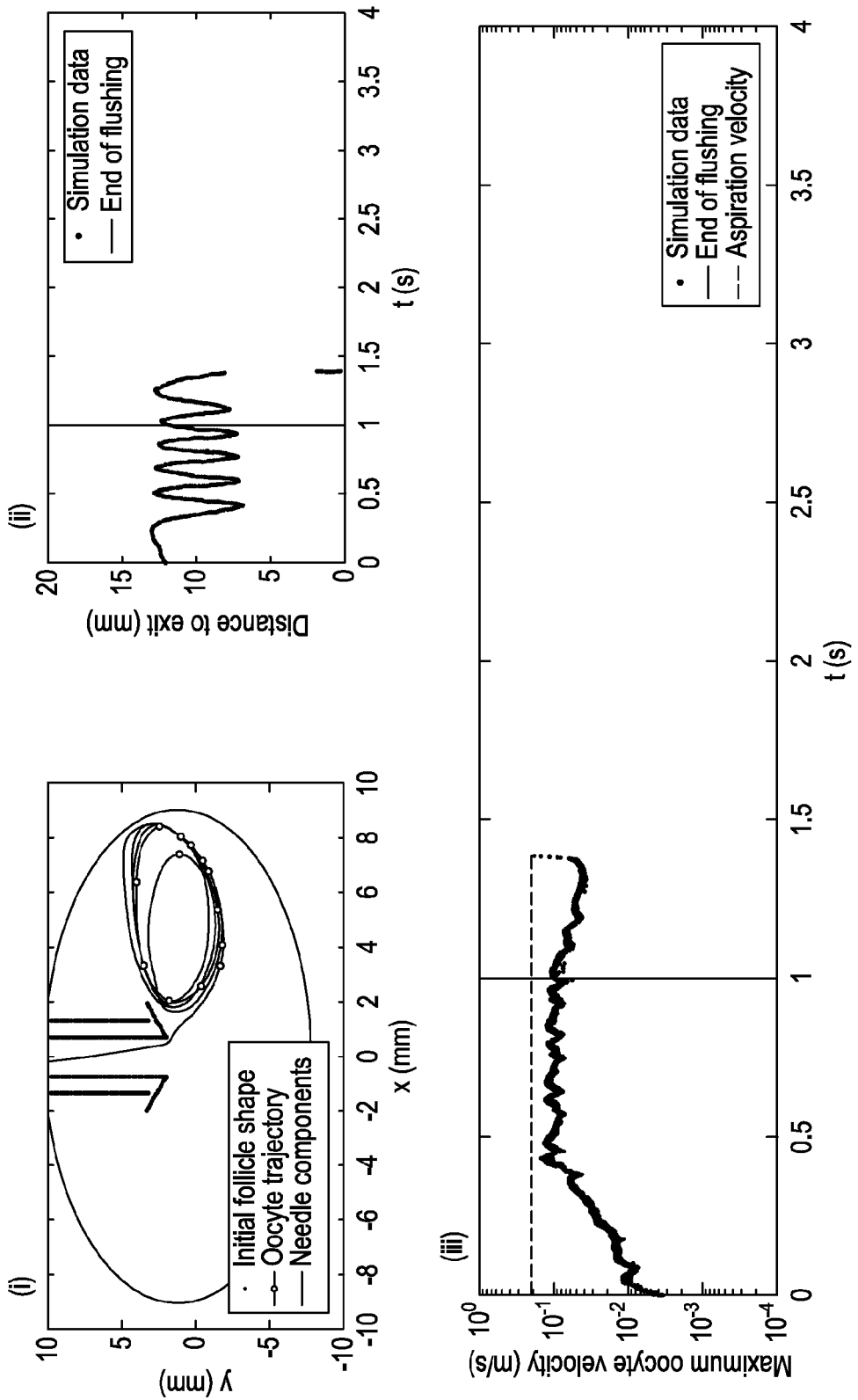
Figure 5D:
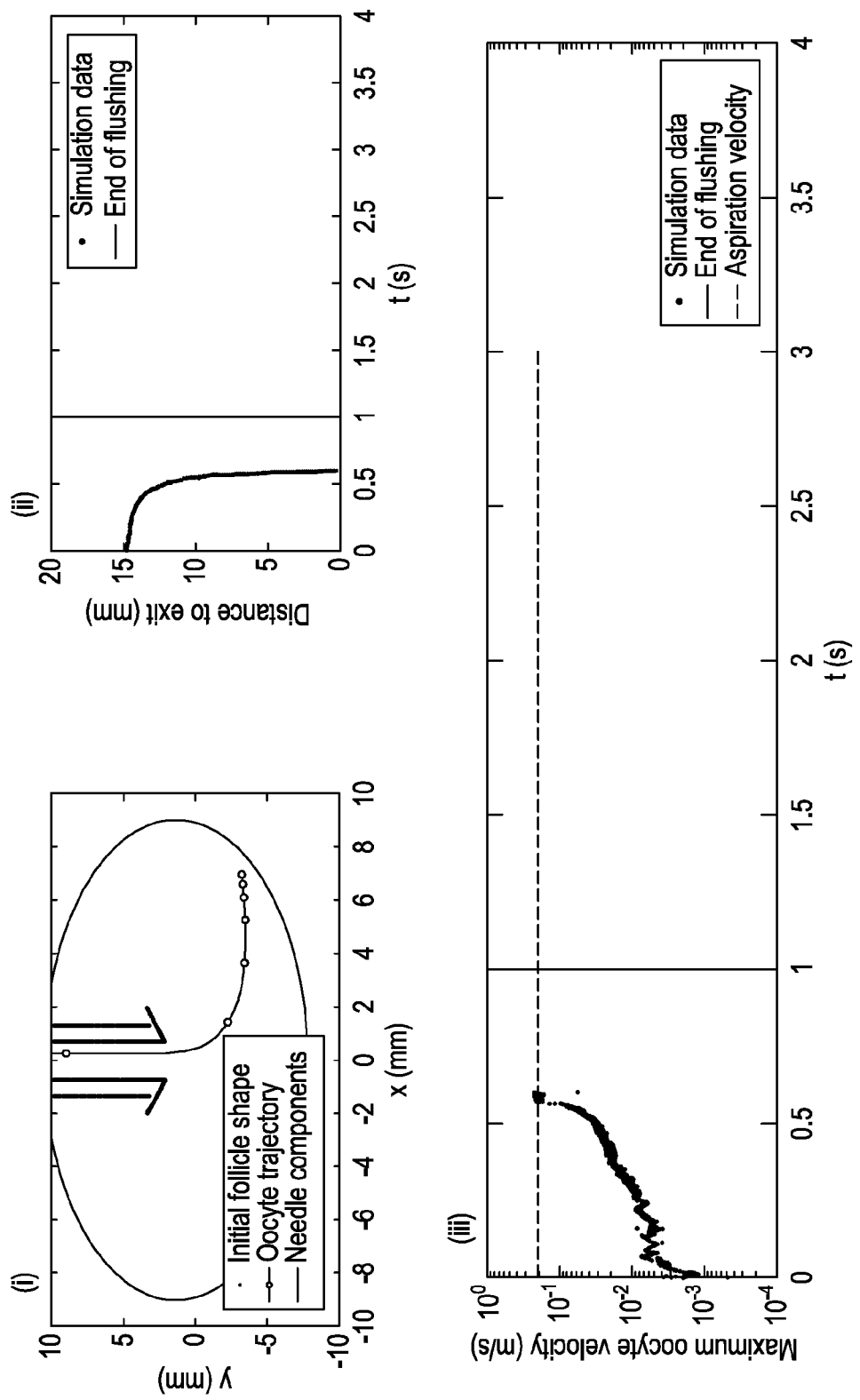
Figure 5E:
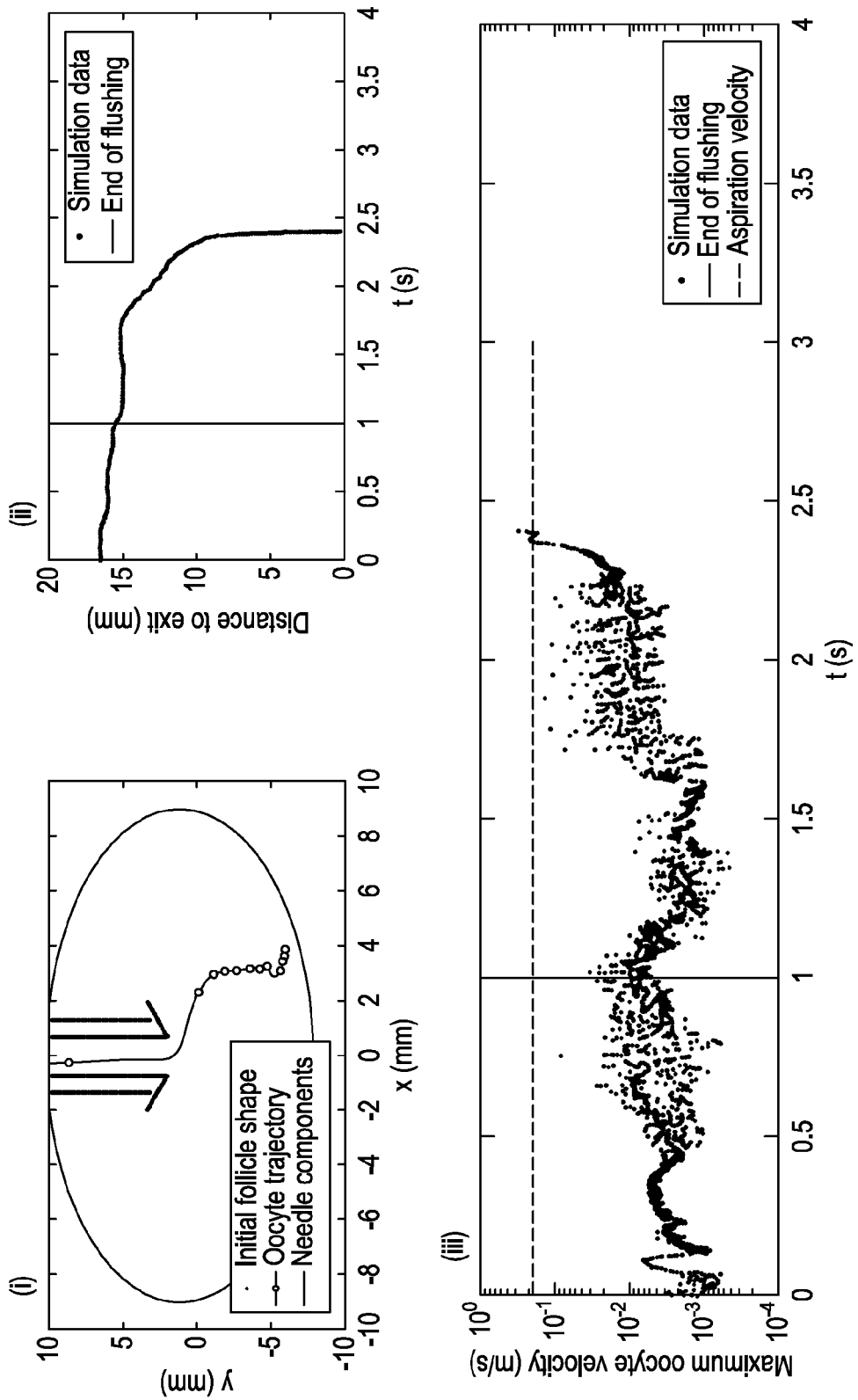
Figure 5F:
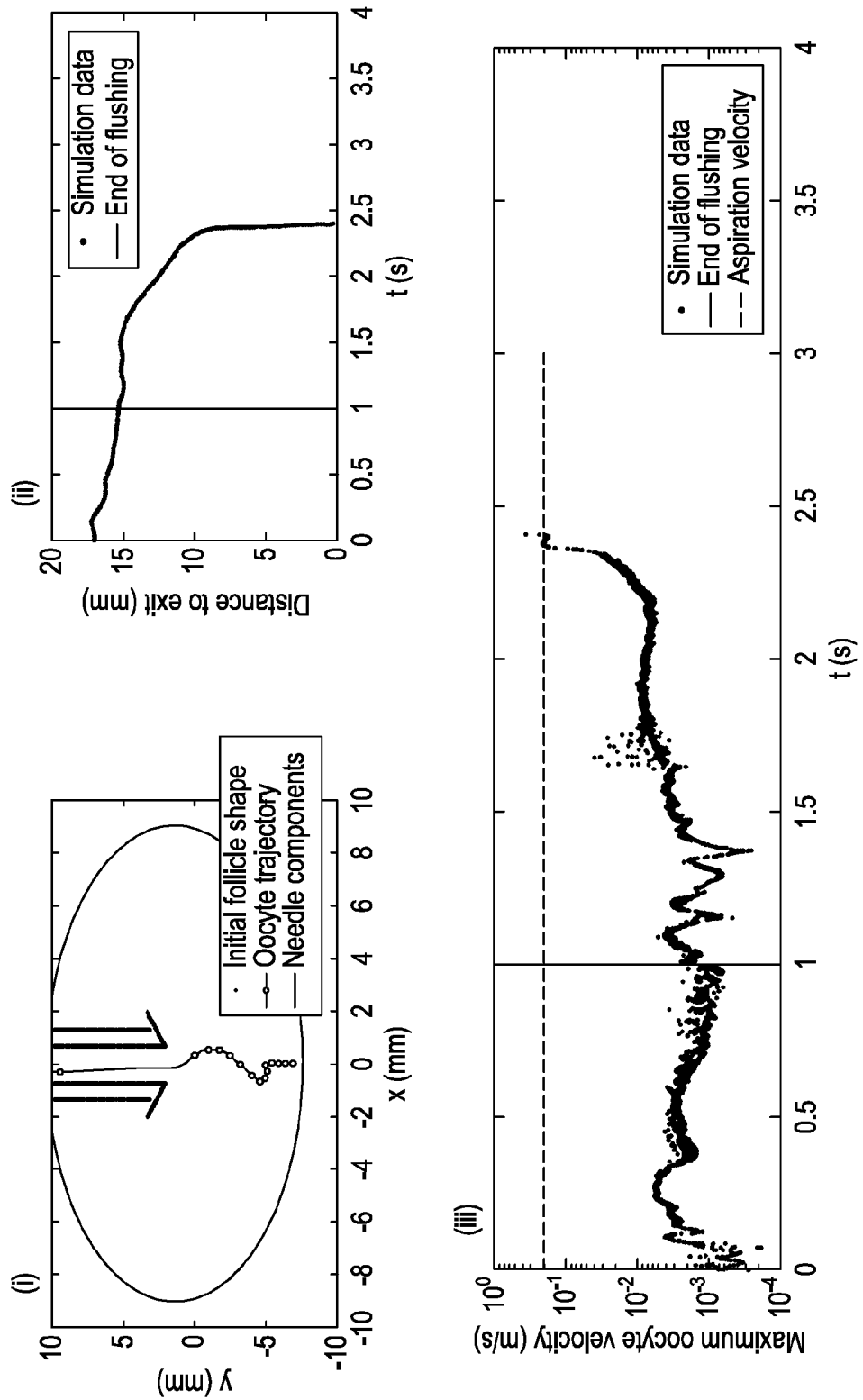

As best seen in plot (i) of FIGS. 5a-5c, the introduction of the flushing flow via the outlet 206 acts to create vortical structures in the flow within the follicle. These vortical structures act to pick up the oocyte from the areas adjacent to the needle insertion point. The overall, net flow encompasses a much greater volume than the net flows created by the needle 100 of the prior art. This net flow acts to move the oocyte from its location within the follicle towards the inlet and the first flow path.

From plots (iii) of FIGS. 5a-5f it can be seen that the oocyte velocities never exceed the aspiration velocity, despite the more complex flow field and increase in velocities in regions less affected or unaffected in the prior art. The oocyte is therefore not exposed to any increased likelihood of damage as the maximum velocities can be correlated to maximum forces.

Any of the aforementioned disclosed features may be taken alone or in any combination, including the deletion of any of said features.

The apparatuses and methods described herein are directed towards use in IVF treatment for the extraction of an oocyte from an ovarian follicle. It will be appreciated that other uses may be envisaged. For example other medical uses may include the aspiration of other biological matter from other intracorporeal sacs, such as the extraction of pus from an abscess. Other uses may be in the veterinary field, for example in IVF.

The invention claimed is:

1. A needle for extraction of biological material from a fluid filled intracorporeal sac, the needle comprising:
    a shaft comprising:
        a first flow channel comprising an inlet for aspirating biological material from the intracorporeal sac; and
        a second flow channel comprising an outlet for supplying a flushing fluid to the intracorporeal sac;
    wherein:
        the first flow channel is an inner flow channel, and the second flow channel is an outer flow channel; and
        the outlet comprises a plurality of perforations in an outer wall of the second flow channel, wherein the plurality of perforations are arranged circumferentially around the wall of the outer flow channel such that the outlet is configured to direct the flushing fluid in a direction substantially transverse to the first flow channel.

2. A needle according to claim 1 wherein the outlet is configured to create a vortical flow in the intracorporeal sac.

3. A needle according to claim 1 wherein the inlet and the outlet are located at or proximal to a distal end of the needle.

4. A needle according to claim 1 wherein the second flow channel is arranged concentrically about the first flow channel.

5. A needle according to claim 4, further comprising a tip for inserting the needle into a fluid filled intracorporeal sac.

6. A needle according to claim 5, wherein the first flow channel protrudes beyond the second flow channel at the tip of the needle.

7. A needle according to claim 6, wherein the needle comprises a flange, wherein the flange defines the outlet at least in part.

8. A needle according to claim 7 wherein the flange is positioned on a wall of the first flow channel.

9. A needle according to claim 7 wherein the flange is annular.

10. A needle according to claim 9, wherein the flange is frustoconical or frustopyramidal.

11. A needle according to claim 7 wherein an internal angle between the flange and the first flow channel is between 5° and 75°.

12. A needle according to claim 7 wherein an internal angle between the flange and the first flow channel is between 30° and 60°.

13. A needle according to claim 7 wherein the flange is of unitary construction with the first flow channel.

14. A needle according to claim 7, wherein the flange provides a baffle for redirecting flushing fluid in a direction substantially transverse to an axis of the first fluid channel.

15. A needle according to claim 1, wherein the first and/or the second flow channel(s) comprises a plurality of flow channels.

16. A needle according to claim 1, wherein the inlet comprises an opening adjacent to an end cap of the first flow channel.

17. An aspiration device comprising:
    the needle of claim 1;
    suction means; and
    collection means.

18. A method of extracting an oocyte from a follicle using the needle of claim 1 or the aspiration device of claim 17, the method comprising the steps of:
    inserting the needle into a follicle located within the ovary;
    supplying a flushing fluid into the follicle through the second flow channel; and
    aspirating the oocyte from the follicle through the first flow channel.

19. A method of extracting a biological material from an intracorporeal sac using the needle of claim 1 or the aspiration device of claim 17, the method comprising the steps of:
    inserting the needle into the sac;
    supplying a flushing fluid into the sac through the second flow channel; and
    aspirating the biological material from the sac through the first flow channel.

20. A method according to claim 18, the method comprising introducing the flushing fluid transverse to an aspiration direction.

21. A method according to claim 19, the method comprising introducing the flushing fluid transverse to an aspiration direction.

* * * * *